US009860494B2

(12) United States Patent
Johnson et al.

(10) Patent No.: US 9,860,494 B2
(45) Date of Patent: Jan. 2, 2018

(54) SYSTEM AND METHOD FOR CALIBRATING A DISPLAY SYSTEM USING A SHORT THROW CAMERA

(71) Applicant: Scalable Display Technologies, Inc., Cambridge, MA (US)

(72) Inventors: Tyler M. Johnson, South Boston, MA (US); Kevin Amaratunga, Belmont, MA (US); Rajeev J. Surati, Cambridge, MA (US); Samson J. Timoner, Cambridge, MA (US)

(73) Assignee: Scalable Display Technologies, Inc., Cambridge, MA (US)

( * ) Notice: Subject to any disclaimer, the term of this patent is extended or adjusted under 35 U.S.C. 154(b) by 0 days.

(21) Appl. No.: 14/213,789

(22) Filed: Mar. 14, 2014

(65) Prior Publication Data
US 2014/0313423 A1    Oct. 23, 2014

Related U.S. Application Data

(60) Provisional application No. 61/800,392, filed on Mar. 15, 2013.

(51) Int. Cl.
*H04N 9/31* (2006.01)
*G03B 35/20* (2006.01)
*G03B 21/13* (2006.01)
*G03B 37/04* (2006.01)
(Continued)

(52) U.S. Cl.
CPC ........... *H04N 9/3147* (2013.01); *G03B 21/13* (2013.01); *G03B 35/20* (2013.01); *G03B 37/04* (2013.01); *H04N 9/3179* (2013.01); *H04N 9/3194* (2013.01); *H04N 21/4122* (2013.01);
(Continued)

(58) Field of Classification Search
CPC .. H04N 9/3147; H04N 9/3179; H04N 9/3182; H04N 9/3188; H04N 9/3191; H04N 9/3194
See application file for complete search history.

(56) References Cited

U.S. PATENT DOCUMENTS 6,219,099 B1 * 4/2001 Johnson et al. ............... 348/383
6,310,650 B1 * 10/2001 Johnson et al. ............... 348/383
6,456,339 B1    9/2002 Surati et al.
(Continued)

FOREIGN PATENT DOCUMENTS

JP    2003219324 A    7/2003
WO    2007002143 A2   1/2007
(Continued)

*Primary Examiner* — Bao-Luan Le
(74) *Attorney, Agent, or Firm* — Loginov & Associates; William A. Loginov

(57) ABSTRACT

This invention overcomes disadvantages of the prior art by providing a system and method that allows for the calibration of a display system using one or more cameras whose lenses are not modeled, or are modeled with limited accuracy, and are potentially incapable of imaging the entire projector system. The illustrative system and method generally relies on well-established models of the projectors, rather than well-established models of the cameras. Illustratively, the cameras serve mainly to map the projectors into one coordinate system, where the overlap between the projectors can be established very precisely using a camera, even if the model of the camera lens properties is not known, or known only minimally.

17 Claims, 8 Drawing Sheets

(51) Int. Cl.
*H04N 21/41* (2011.01)
*G06F 3/14* (2006.01)

(52) U.S. Cl.
CPC ... *G06F 3/1446* (2013.01); *G09G 2320/0693* (2013.01); *G09G 2360/145* (2013.01)

(56) References Cited

U.S. PATENT DOCUMENTS

| | | | |
|---|---|---|---|
| 6,471,355 B1 * | 10/2002 | Monson et al. | 353/30 |
| 6,520,647 B2 | 2/2003 | Raskar | |
| 6,525,772 B2 * | 2/2003 | Johnson et al. | 348/383 |
| 6,527,395 B1 | 3/2003 | Raskar et al. | |
| 6,570,623 B1 * | 5/2003 | Li et al. | 348/383 |
| 6,677,956 B2 | 1/2004 | Raskar et al. | |
| 6,709,116 B1 * | 3/2004 | Raskar | G01B 11/25 348/E5.137 |
| 6,715,888 B1 | 4/2004 | Raskar et al. | |
| 6,729,733 B1 * | 5/2004 | Raskar | H04N 5/74 348/744 |
| 6,733,138 B2 | 5/2004 | Raskar | |
| 6,755,537 B1 * | 6/2004 | Raskar | H04N 5/74 348/383 |
| 6,764,185 B1 | 7/2004 | Beardsley et al. | |
| 6,781,591 B2 | 8/2004 | Raskar | |
| 6,793,350 B1 | 9/2004 | Raskar et al. | |
| 6,811,264 B2 | 11/2004 | Raskar et al. | |
| 6,834,965 B2 | 12/2004 | Raskar et al. | |
| 7,001,023 B2 | 2/2006 | Lee et al. | |
| 7,131,733 B2 | 11/2006 | Shibano | |
| 7,137,707 B2 | 11/2006 | Beardsley et al. | |
| 7,154,395 B2 | 12/2006 | Raskar et al. | |
| 7,237,911 B2 | 7/2007 | Yamada | |
| 7,242,818 B2 | 7/2007 | Beardsley et al. | |
| 7,252,387 B2 | 8/2007 | Raskar et al. | |
| 7,292,269 B2 | 11/2007 | Raskar et al. | |
| 7,355,583 B2 | 4/2008 | Beardsley et al. | |
| 7,421,111 B2 | 9/2008 | Dietz et al. | |
| 7,740,361 B2 * | 6/2010 | Jaynes | H04N 9/3147 345/1.3 |
| 7,763,836 B2 * | 7/2010 | Webb et al. | 250/208.1 |
| 7,901,094 B2 * | 3/2011 | Tan et al. | 353/121 |
| 8,042,954 B2 * | 10/2011 | Tan et al. | 353/94 |
| 8,045,006 B2 * | 10/2011 | Miceli | 348/189 |
| 8,218,003 B2 * | 7/2012 | Tan et al. | 348/135 |
| 8,251,512 B2 * | 8/2012 | Adkins et al. | 353/30 |
| 8,477,241 B2 * | 7/2013 | Chang et al. | 348/383 |
| 8,870,389 B2 * | 10/2014 | Harada | H04N 9/3147 348/95 |
| 8,934,018 B2 * | 1/2015 | Tsuida | G02B 26/101 348/159 |
| 8,944,612 B2 * | 2/2015 | Chang et al. | 353/94 |
| 9,066,088 B1 * | 6/2015 | Webb et al. | |
| 2002/0027608 A1 * | 3/2002 | Johnson et al. | 348/383 |
| 2007/0115361 A1 | 5/2007 | Bolas et al. | |
| 2007/0268306 A1 * | 11/2007 | Webb et al. | 345/600 |
| 2007/0273795 A1 * | 11/2007 | Jaynes | H04N 9/3147 348/745 |
| 2008/0129894 A1 * | 6/2008 | Kang et al. | 348/758 |
| 2008/0136976 A1 | 6/2008 | Ajito et al. | |
| 2008/0174516 A1 * | 7/2008 | Xiao et al. | 345/1.3 |
| 2008/0174704 A1 * | 7/2008 | Tan et al. | 348/745 |
| 2008/0246781 A1 | 10/2008 | Surati et al. | |
| 2008/0259223 A1 * | 10/2008 | Read et al. | 348/745 |
| 2009/0002637 A1 * | 1/2009 | Harada | H04N 9/3147 353/30 |
| 2009/0091615 A1 * | 4/2009 | Tan et al. | 348/125 |
| 2009/0153501 A1 * | 6/2009 | Schultz et al. | 345/173 |
| 2010/0245684 A1 * | 9/2010 | Xiao et al. | 348/745 |
| 2010/0277655 A1 * | 11/2010 | Sun | 348/744 |
| 2010/0321382 A1 | 12/2010 | Amaratunga et al. | |
| 2011/0007172 A1 * | 1/2011 | Miceli | 348/222.1 |
| 2011/0309999 A1 * | 12/2011 | Chang et al. | 345/1.1 |
| 2012/0007986 A1 * | 1/2012 | Tsuida | G02B 26/101 348/159 |
| 2012/0019670 A1 * | 1/2012 | Chang et al. | 348/189 |
| 2012/0120372 A1 * | 5/2012 | Timoner et al. | 353/31 |
| 2012/0320042 A1 * | 12/2012 | Green et al. | 345/419 |

FOREIGN PATENT DOCUMENTS

WO 2007002353 A2 1/2007
WO WO 2012068112 A1 * 5/2012

* cited by examiner

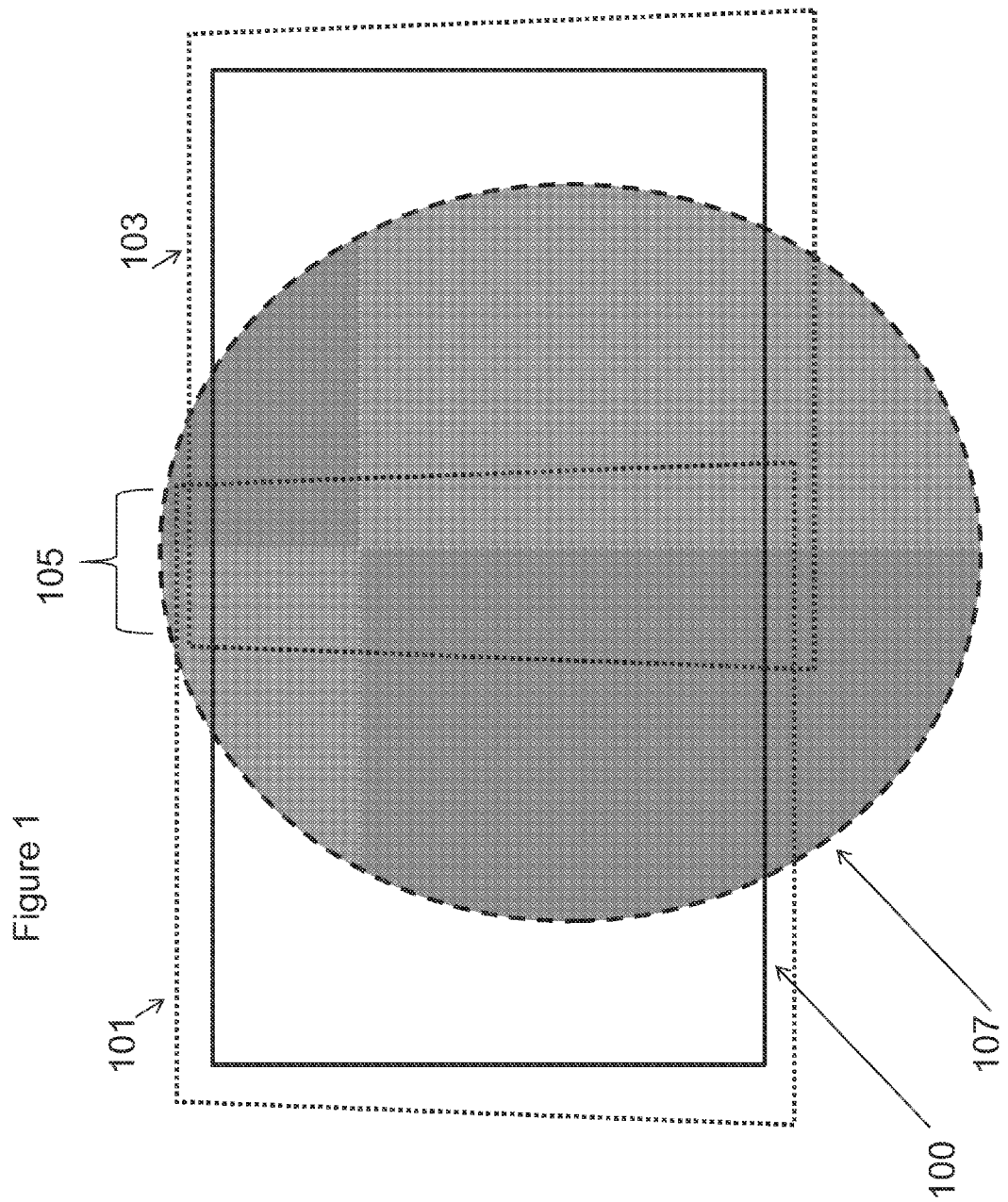

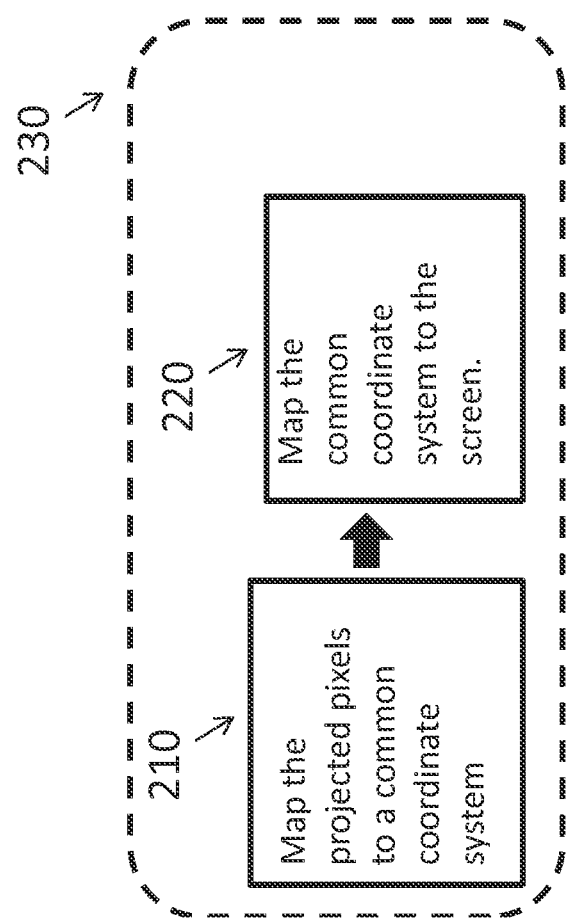

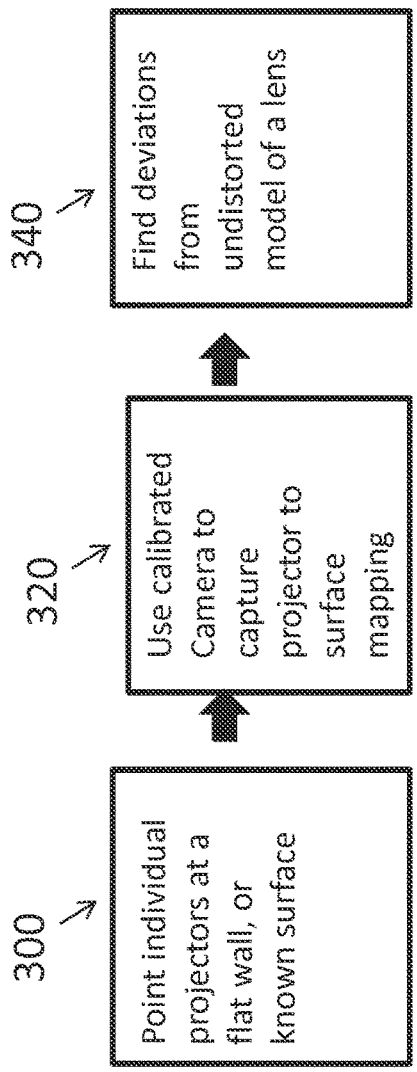
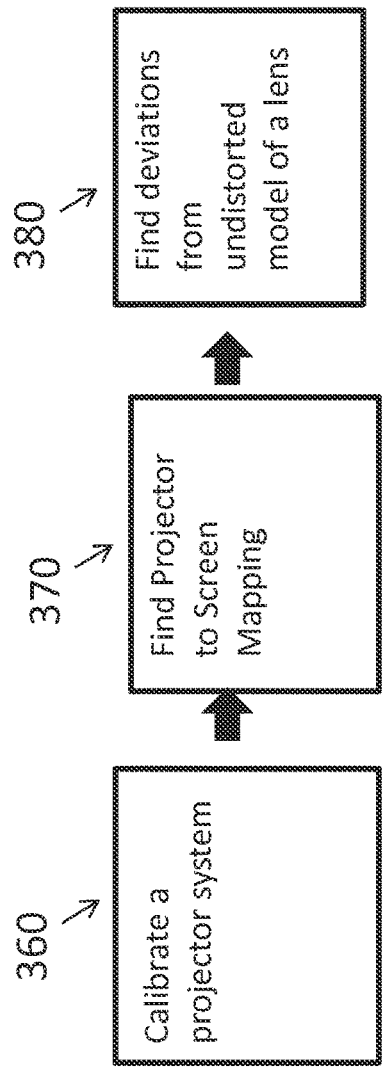

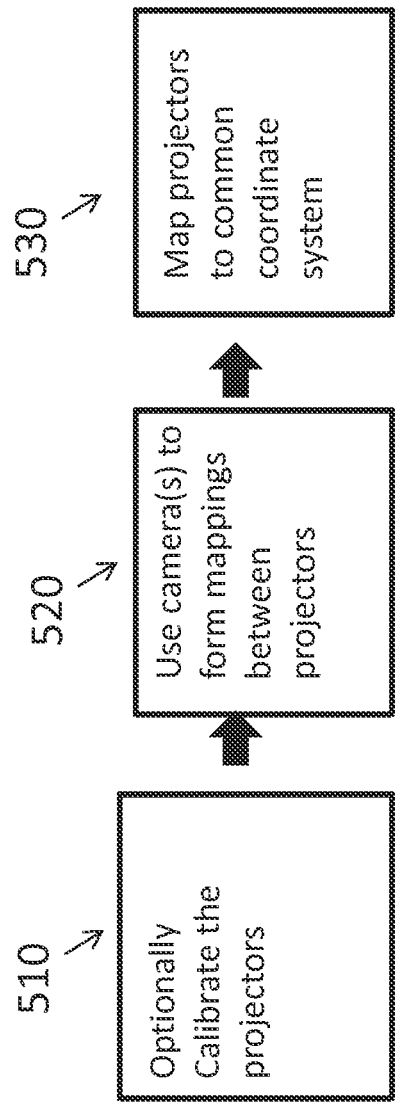

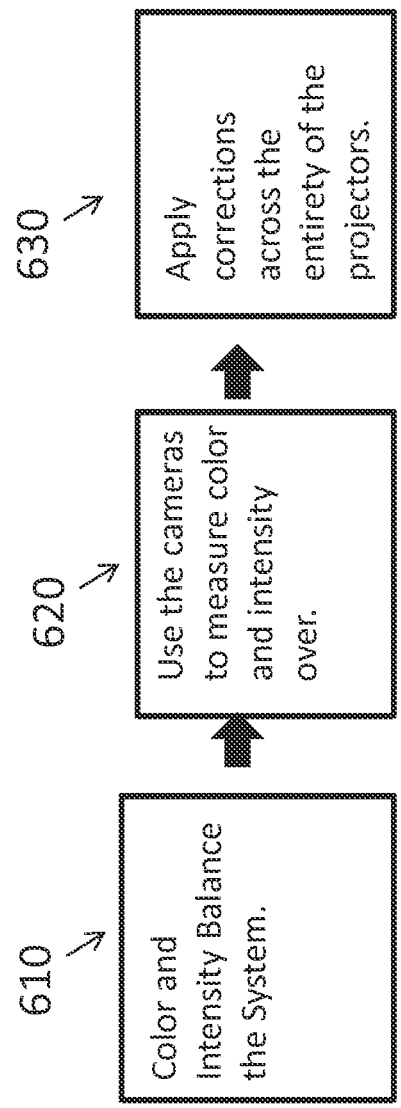

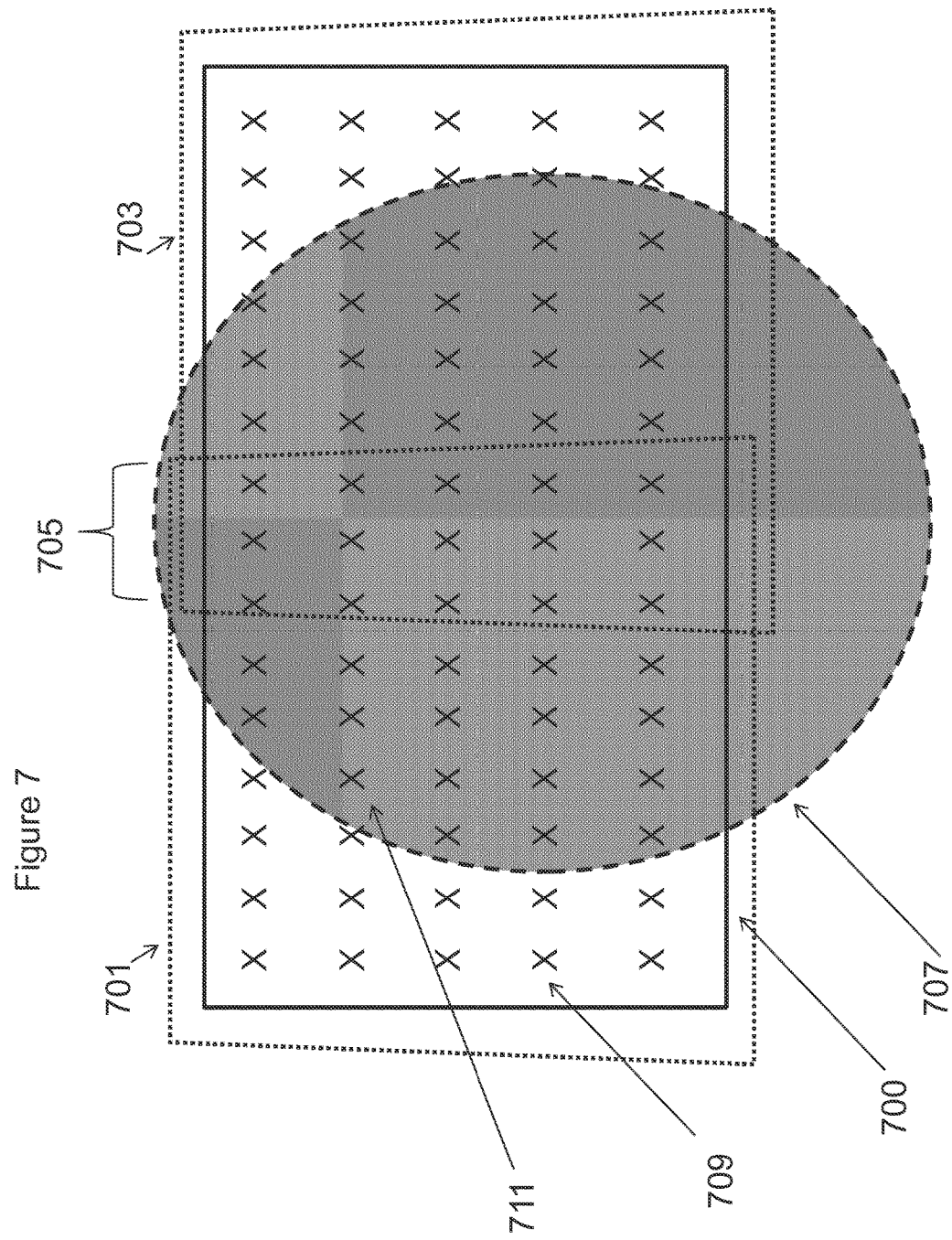

SYSTEM AND METHOD FOR CALIBRATING A DISPLAY SYSTEM USING A SHORT THROW CAMERA

RELATED APPLICATION

This application claims the benefit of U.S. Provisional Application Ser. No. 61/635,380, filed Mar. 15, 2013, entitled SYSTEM AND METHOD FOR CALIBRATING A DISPLAY SYSTEM USING A SHORT THROW CAMERA, the entire disclosure of which is herein incorporated by reference.

FIELD OF THE INVENTION

This invention is related to displays, and focused on, but not exclusive to, multi-projection display systems, and particularly to systems and methods for calibrating display systems with cameras whose lens properties are known inaccurately or are not known at all, and with cameras that may not be able to image the entire display system.

BACKGROUND OF THE INVENTION

Calibration of tiled projector systems with cameras and other optical sensors have become more and more commonplace. One of the main goals of an auto-calibration system is to maintain the quality of the system (such as linear geometry, uniform color and intensity) as the system ages, without the use of a trained technician. For example, it is desirable that a person with no training can push a "Calibrate' button in a graphical user interface (GUI) and the system re-calibrates. It is not desirable that the user should be required to undertake a fine-tuning process requiring many interactions with a GUI, as that process can be time consuming and require training on the part of the user.

One tiled display that is particularly of interest is designed for use in a conference room environment. In a conference room, it is contemplated that a high resolution display can be constructed using M×N short throw projectors. When used in a front-projector configuration, short throw projectors are useful as one can walk right up to the screen without casting a shadow on the display until one is very close to the screen. Also, whether used in front projector or rear-projection setups, the projectors occupy a small depth which is useful in installations such as conference room, where there is limited space.

To calibrate such a system, it is often desirable to mount the camera very near the projectors. One reason this positioning is desirable is that it allows for a self-contained installation, which simplifies the task of the installer, and more generally lowers installation costs. This positioning is also desirable in that it avoids a condition in which a camera placed across a room space is more likely to be blocked by passers-by than a short throw arrangement. Locating such a camera across the room is also undesirable in that it typically requires cables to be run from the system to the camera, and that typically entails running such cables into the walls and around the room. This can be obtrusive and create an unaesthetic appearance in a public space. Alternatively it can prove time-consuming and costly to install the cables invisibly in the walls and/or ceiling.

Thus, a short throw camera is desirable in such installations as it allows for a self-contained installation and avoids undesirable wiring arrangements and blockage of the filed of view. However, when such a camera is close up to the display, at least two challenging effects occur. First, it can be necessary to employ a plurality of cameras with fish-eye, or other wide-angle, lenses because the cameras are not far from the screen, and it is otherwise difficult to image a significant field of view. Fish-eye lenses can be problematic because it can be difficult to accurately measure the distortions of the lenses. Furthermore, the distortion of the scene in the camera image is not only sensitive to the properties of the lens, but it is very sensitive to the positioning of the lens on top of the camera imager, and the position and orientation of the camera. The distortion is particularly sensitive toward the outside of the lenses. Thus, if one relies on the accuracy of the lens model of the fish-eye lenses during the projection display calibration, the resulting displayed images on the screen often appear distorted.

Also challenging is the fact that it can be prove challenging to image the entire screen with a short throw distance that can be only a few inches.

Thus, it is desirable to create an automatic calibration system that is straightforward to operate, does not rely on an accurate model of the camera distortion of the scene, and can handle situations where the camera cannot image the entire screen.

SUMMARY OF THE INVENTION

This invention overcomes disadvantages of the prior art by providing a system and method that allows for the calibration of a display system using one or more cameras whose lenses are not modeled, or are modeled with limited accuracy, and are potentially incapable of imaging the entire projector system. The illustrative system and method generally relies on well-established models of the projectors, rather than well-established models of the cameras. Illustratively, the cameras serve mainly to map the projectors into one coordinate system, where the overlap between the projectors can be established very precisely using a camera, even if the model of the camera lens properties is not known, or known only minimally.

One or more aspects of the disclosure provide a method of calibrating a projector system having two or more projectors, with one or more cameras, free of requiring the one or more cameras to image the entire screen, comprising the steps of: (a) capturing, with the one or more cameras, one or more projected patterns from the projectors; and mapping the projected pixels from each projector into a common coordinate system, the step of mapping being free of depending on a model of the lens properties of the camera; and (b) mapping the common coordinate system to the screen, free of depending on a model of the lens properties of the one or more cameras.

In one example, the projectors are pre-calibrated.

In one example, either of the mapping of steps (a) or step (b) is are formed using a model of the projector.

In one example, the model of the projector includes a model of distortions from an idealized model of a projector mapping.

In one example, the modeled projector to surface mapping is pre-calibrated by measurement.

In one example, the pre-calibrated measurement is deduced while the projector is part of the calibrated system.

In one example, the mapping of projectors to the common coordinate system includes the step of using the one or more cameras to measure differences between the an overlap of the projectors and the a modeled overlap of the projectors.

In one example, the model of the projector includes a model of distortions from an idealized model of a projector mapping.

In one example, the differences measured by the one or more cameras are applied between the two or more projectors and the common coordinate system using edge-blending techniques.

In one example, the projectors are projecting onto a flat screen and the step of mapping to the common coordinate system includes using the one or more cameras to find homographies between the optionally pre-calibrated projectors.

In one example, the projectors are projecting onto a curved screen with known or parameterized geometry, the projectors are optionally pre-calibrated, and the step of mapping to a common coordinate system includes using the model of the projector to surface mapping of the optional pre-calibrated projectors.

In one example, mapping the common coordinate system to the screen further comprising comprises locating fiducials on the screen using the one or more cameras.

In one example, the method further comprises storing intensity and color information and balancing intensity and color using regions of the projector system that are imaged by the one or more cameras.

In one example, the projectors are pre-calibrated and the step of mapping to the common coordinate system includes using the one or more cameras to find homographies between the pre-calibrated projectors.

In one example, the projectors are pre-calibrated and the step of mapping to a common coordinate system includes using the model of the projector to surface mapping of the pre-calibrated projectors.

In one example, the measurement includes measuring data from the projectors in a controlled environment.

In one example, the one or more cameras image a first portion of the entire screen, thereby defining a second portion of the entire screen not imaged by the one or more cameras.

Another aspect of the disclosure provides a system for calibrating a projector system having two or more projectors, with one or more cameras, free of requiring the cameras to image the entire screen, comprising: (a) one or more cameras that capture images of one or more projected patterns from the projectors and a mapping process that maps the projected pixels from each projector into a common coordinate system, the mapping process being free of dependence on a model of the lens properties of the camera; and (a) the common coordinate system being mapped to the screen, free of depending on a model of the lens properties of the one or more cameras.

In an illustrative embodiment, a short throw camera is used to calibrate a two projector display on a flat wall, tiled horizontally with a small overlap. The camera takes pictures of patterns from each projector and finds correspondences between the projectors in the overlap zone. The projectors can be mapped to a common coordinate system, using for example, a homography from each projector to the common coordinates, and the common coordinate system is then mapped to the screen.

The model of the projectors can optionally be pre-calibrated by measuring the projector intrinsic parameters and distortion from an ideal projector. Without loss of generality, one method for pre-calibrating the model of the projector includes measuring data from the projector in a controlled environment. Without loss of generality, a second method is doing a full calibration of the projector in-situ (for example, using a well-calibrated camera to calibrate the screen) and using the results to back-calculate the distortion pattern. If the projectors are pre-calibrated and homographies are desired to map the projectors to a common coordinate system, the mapping to the common coordinate system becomes two steps: removing the pre-calibrated distortion pattern then applying the homography.

The model of the overlap and correspondences of the projectors in the common coordinate system and the data collected by the camera will typically be different. That is, the models do not fit the data perfectly. The data collected by the camera is used to find the differences between the model and the actual correspondences of the projector. That differences, represented as a displacement field for example, is partially applied to each projector such that the combination of the two applications compensates for the differences seen by the camera. In the simple case of a boundary zone with four edges: at the left edge of the overlap zone, the applied displacement field is set to 0 for the left projector, and the full amount for the right projector. On the right edge of the overlap zone, the applied displacement field is set to zero (0) for the right projector, and the full amount for the left projector. Edge-blend style algorithms are used to find the displacement field to be applied each projector such that the total compensates for the differences seen by the camera. These same edge-blend style algorithms can be used for overlap regions whose shapes are more complicated.

Once all the corrections are made for mapping from the projectors to the common coordinate system, the common coordinate system is mapped to the screen, forming an overall mapping that can be used to show video and imagery across the two projectors seamlessly using standard mechanisms and processes.

In an illustrative embodiment, a system and method for calibrating a projector system having two or more projectors, with one or more cameras, free of requiring the cameras to image the entire screen, is provided. The system and method captures, with the one or more cameras, one or more projected patterns from the projectors. The projected pixels are mapped from each projector into a common coordinate system. Notably, the step of mapping is free of depending on a model of the lens properties of the camera. The common coordinate system is mapped to the screen, also free of depending on a model of the lens properties of the camera. In an embodiment, the projectors are optionally pre-calibrated. Also, either mapping is formed using a model of the projector. Illustratively, the model of the projector includes a model of distortions from an idealized model of a projector mapping. The modeled projector to surface mapping can be pre-calibrated by measurement. This pre-calibrated measurement can be deduced while the projector is part of the calibrated system. The mapping of projectors to the common coordinate system can include using the camera to measure differences between the overlap of the projectors and the modeled overlap of the projectors. The differences measured by the camera can be applied using edge-blending techniques. In an embodiment, the projectors project onto a flat screen and mapping to the common coordinate system includes using the one or more cameras to find homographies between the optionally pre-calibrated projectors. Alternatively, the projectors project onto a curved screen with known or parameterized geometry. In this case, the projectors are optionally pre-calibrated, and the step of mapping to a common coordinate system includes using the model of the projector to surface mapping of the optional pre-calibrated projectors. In embodiments, fiducials are located on the screen. Also in embodiments, the system and method stores intensity and color information and balances intensity and color using regions of the projector system that are imaged by the one or more cameras.

BRIEF DESCRIPTION OF THE DRAWINGS

The invention description below refers to the accompanying drawings, of which:

FIG. 1 is a block diagram of the display provided by two projectors keystoned on a screen with a camera that can only image the overlap region between the projectors;

FIG. 2 is a block diagram of the overall display calibration process according to an illustrative embodiment;

FIG. 3a is a block diagram of a method of pre-calibrating the lens models of the projectors for use in the overall calibration process;

FIG. 3b is a block diagram of a method of pre-calibrating the lens models of the projectors in situ;

FIG. 5 is a block diagram of mapping projected pixels to a common coordinate system for a curved screen;

FIG. 6 is a block diagram describing a method of color and intensity calibrating according to an illustrative embodiment;

FIG. 7 is a block diagram of a display provided by two projectors keystoned on a screen with a camera that can image the overlap region between the projectors, and with fiducial marks on the screen that the camera can image.

DETAILED DESCRIPTION

Figure 1A:
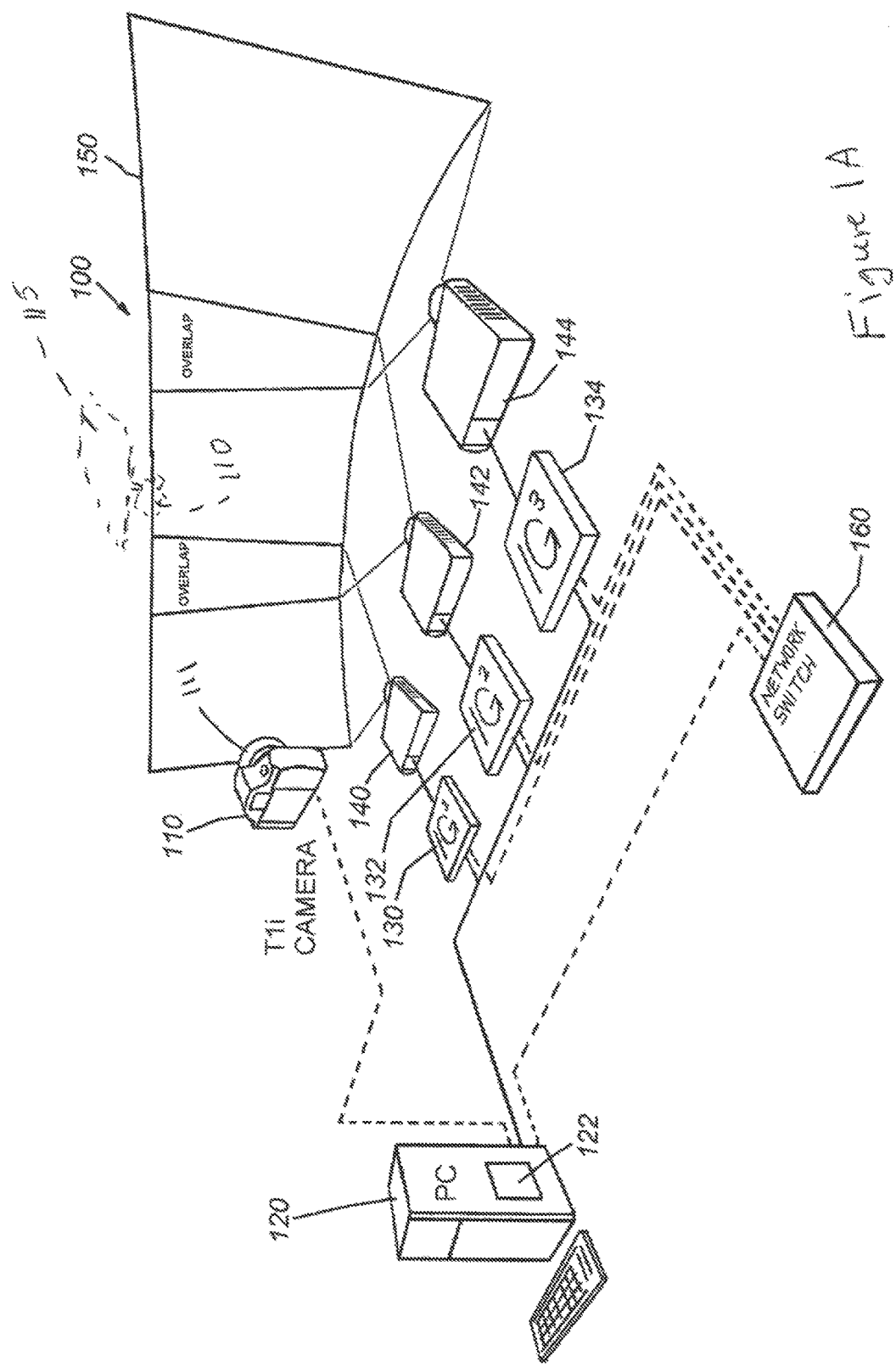
FIG. 1A is an exemplary projection arrangement using a plurality of projectors that overlap and are calibrated based upon images acquired by a camera.

FIG. 1 shows the outline of screen 100, with the outlines of two projectors, 101 and 103, shown overlapping. The projectors 101 and 103 overlap on the screen in region 105. In this example, the projectors overfill the screen. The oval-shaped outline of the region of the screen(s) that is imaged by the camera is shown as a somewhat circular shape 107. Typically, the region that a camera can image would be indicated as a rectangle, or trapezoid. If, however, the camera has a fish-eye lens installed, then the field of view it can image is more accurately represented as a circle or keystoned (slightly wider at the bottom than top, similar to the appearance of the overlap) circle. This keystoned appearance is a result of the non-perpendicular orientation of both the projector and camera optical axes with respect to the screen—which is due to their location above the screen so as to remain out of the field of view of users.

Note also that the camera need not image the entire screen. In this case, the camera is positioned to image the entirety of the overlap region 105. Also, the illustrative processes described herein do not require, and can operate if the camera cannot effectively image the entire region 105. In some instances, a smaller camera field of view or obstruction can limit the ability of the camera to acquire an image of the entire region. The illustrative processes herein can operate with such a partial image of the overlap region 105.

It is recognized that an auto-calibration system often involves two steps: (a) mapping projected pixels to a single coordinate system, and then (b) mapping that coordinate system to the screen. Reference is made, by way of useful background, to U.S. Published Patent Application No. 2012/0120372, entitled SYSTEM AND METHOD FOR CALIBRATING A DISPLAY SYSTEM USING MANUAL AND SEMI-MANUAL TECHNIQUES, who teachings are incorporated herein by reference and whose techniques are similar to the teachings of the present embodiments. This incorporated application employs manual or semi-manual techniques to perform each of the two mappings. For example, in that patent, "FIG. 8 shows an embodiment where additional information is used to update the mapping from the projectors to the common coordinate system. The first few steps are exactly as was done in FIG. 4. In step 810, the mapping to the common coordinate system is formed as described above. In step 820, additional information is collected about boundaries, known fiducial points, edges, and/or corners. (In FIG. 4, such information was collected for the boundaries of the screen and the corners points). In Step 830, the combined information is used to form a mapping from the common coordinate system to the screen as was done in FIG. 4. In step 840, both the mappings to the common coordinate system and the mapping from the common coordinate system to the screen are updated concurrently. In an illustrative embodiment, this is accomplished as described above by modeling the projectors as optical objects. In this case, the mapping from the projectors to the common coordinate system may be improved by the estimates of the projection matrix of the projectors. And, that changed mapping to the common coordinate system can affect the mapping from the common coordinate system to the screen. For example, the result is that the minimization described with FIG. 4 of finding the optical properties of the projector can be used to change both the mapping to the common coordinate system and the mapping of the common coordinate system to the screen simultaneously."

The illustrative embodiments herein concern automatic techniques.

By way of further background, FIG. 1A is a block diagram of an exemplary display system 100 with automatic calibration in accordance with an illustrative embodiment. In this case a single camera sensor 110 is used to calibrate a three-projector system. In embodiments, such as shown in FIG. 1 above, two projectors (e.g. 140 and 142) are employed. As described below, the principles herein are applicable to two or more overlapping display images. The camera 110 can be a conventional unit (e.g. a digital SLR) or a custom arrangement, which is able to measure the geometric location, the color and intensity of the projectors across the system, and create a correction. As described herein, the camera can be arranged as a short throw camera with an appropriate wide-angle (e.g. fish eye) lens assembly 111. An overhead mount 115 (shown in phantom) can be provided to mount the camera 110 (or plurality of cameras). Calibration correction is inserted into a correction produced in the exemplary PC 120 that includes a stored, non-transitory software application (and/or electronic hardware) (block 122) for operating the system and method herein, in an image generated to be sent to the image generators (IGs) (which can be conventional PCs) 130, 132, 134 which then relay the image to the projectors 140, 142, 144 (respectively). Or, the correction can be applied to the IG directly. Part of the color correction can be uploaded to the interconnected projectors 140, 142, 144 (respectively). The projectors 140, 142, 144 thereby project the combined image from the source(s) on a screen 150, typically with appropriate overlap (e.g. a 15% overlap as shown). In an illustrative embodiment, the interconnection between the projectors can be controlled by a network link (wired and/or wireless), which can include a conventional network switch 160.

FIG. 2 shows a generalized block diagram of the procedure (indicated by dashed box 230) for calibrating the system. As described generally above, the first step, 210, is to map the projected pixels from all the projectors onto a common coordinate system. The second step, 220, is to map the common coordinate system to the screen. The dotted box 230 indicates that sometimes the steps 210 and 220 are performed simultaneously. By way of example, sometimes the common coordinate system in 210 is a coordinate system of the screen, in which case step 220 involves no additional processes or work.

FIGS. 3a and 3b respectively show two methods for pre-calibrating projector transfer functions, and distortions in that model. Pre-calibrating projector lenses can be very useful in step 210, though such pre-calibration is not required. Projectors are often modeled as mapping pixels to a flat screen using a homography, or a homography plus a radial distortion. The homography is often broken down into intrinsic parameters (e.g. focal length) and extrinsic parameters (e.g. rotations and translations), though such a decomposition is not required for the performance of the steps herein. The goal of pre-calibrating is either to model the radial distortion of the projector and measure it, or more generally to measure the non-idealities of the projector as a displacement field. (Often, the intrinsic variables are measured as well.) There are many ways to pre-calibrate a projector lens.

Referring further to FIGS. 3a and 3b, each demonstrates an illustrative method for pre-calibration. In FIG. 3a, the process measures the non-idealities of the projector. This can be performed in accordance with ordinary skill in the art. According to the process of FIG. 3a, a projector is directed by a user at, for example, a flat wall as (step 310). In step 320, a camera with a calibrated lens is then used to measure the projector. Often, a calibration pattern in the form of (e.g.) a checkerboard pattern (or another similar repeating/tessellating) calibration pattern is projected by the projector and imaged by the camera to perform its measurements. The process then fits a homography to the data, and finds the deviations from a homography, and decomposes the homography to find the intrinsic properties of the projector. Without loss of generality, the deviations can be stored in a number of ways. One common technique is to trace rays back into the projector and find the deviation from the ideal pixel that should be traced-to according to the homography, and the actual pixel according to the measurements (step 340). An alternate technique is to trace a ray from a pixel out to the screen, and find the deviations in angles between the ideal and the measured values.

Note that it has been observed that many projectors of the same model tend to have highly similar distortion fields and intrinsic parameters. It is therefore possible to measure one distortion field, at the factory for example, and then apply this measurement to all projectors of the same model.

FIG. 3b shows an alternative process for accomplishing the same pre-calibration of the projector. This alternate process begins by calibrating the display system, as in step 360, for example using manual, or semi-manual automatic techniques, or another appropriate method. It is contemplated that the results of this calibration step (360) can be fine-tuned to obtain a geometrically "perfect" calibration. An alternative approach to calibrate the system is to employ one or more temporary, setup cameras whose lens(es) are very well calibrated. Typically, the one or more temporary cameras are positioned at the other side of the room to provide a longer viewing distance. Once the calibration is performed (step 360), in step 370 the mapping from the projector to the screen can be back-calculated using conventional techniques. Then, in step 380, deviations from an ideal lens are measured. In the case of a flat screen, that is a difference from a homography. In the case of a curved screen, a more general model of tracing rays back into the projector and finding the deviation from ideal can be performed in a straightforward way.

The process in FIG. 3b can be advantageous in that the calibration procedure is performed in-situ. One disadvantage, however it is that this process often requires a trained user to perform the steps. However, this more-involved calibration process typically is a one-time operation (e.g. at initial system setup), and the system is more generally maintainable in the long term by an untrained individual.

Figure 4A:
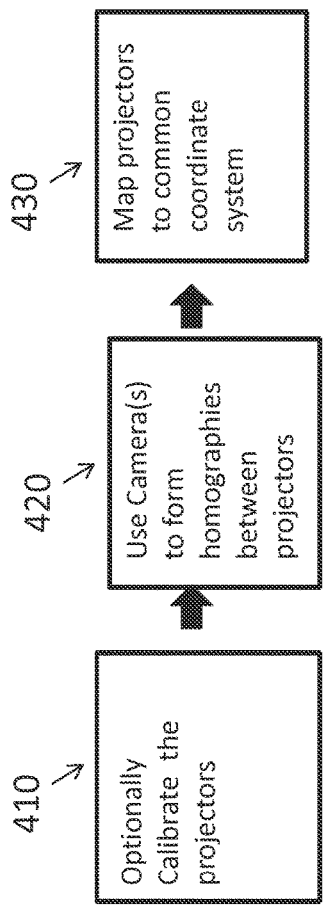
FIG. 4a is a block diagram of mapping projected pixels into a common coordinate system for a flat screen.
Figure 4B:
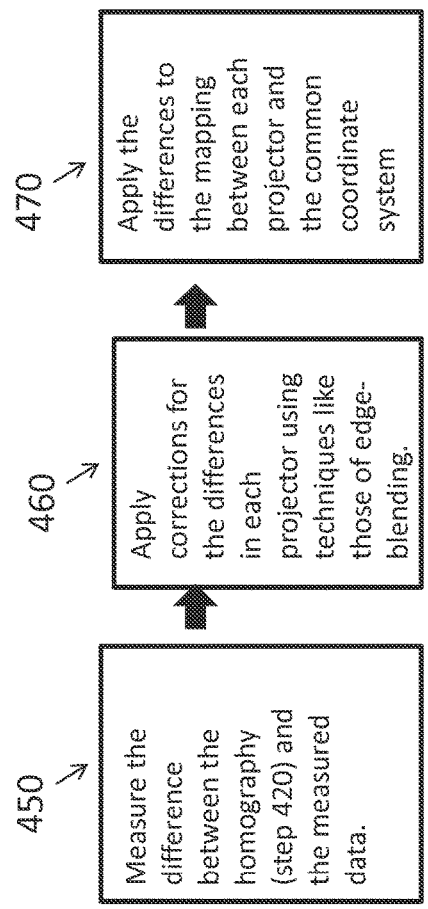
FIG. 4b is a block diagram of improving the mapping from projectors to a common coordinate system.

FIGS. 4a and 4b show a block diagram of accomplishing the mapping step 210. For the purposes of this description, the process of FIG. 4a is performed, illustratively, with two projectors and one camera on a flat screen as illustrated in FIG. 1. The process starts with step 410, by optionally calibrating the projector lens distortions and intrinsics, which can be performed as described in FIGS. 3a and 3b, or by another method. Then in step, 420, the camera images some or all of the blend zone (105) between the two projectors, and thus correspondences between the two projectors can be defined, and a homography between the two projectors can be determined according to general techniques. If the lens distortions have been measured, then the mapping between two projectors will be: (a) un-apply lens distortion of that projector, apply the homography, and then (b) apply the lens distortion of the other projector. In step 430, a common coordinate system between the projectors can be defined. There are many available techniques for forming a common coordinate system, and by way of non-limiting example can be accomplished in the pixel space of the input to one of the projectors. For example, if an exemplary 1024×768 projector image is input to into the projector, a continuous coordinate system from 0 . . . 1024 and 0 . . . 768 in two coordinates can be defined, and then extended as needed to be mapped onto the other projector. Such a coordinate system can be considered highly similar to a virtual camera.

The last step is step 220 (FIG. 2). Often the individual performing initial set up the system chooses four (4) corner points to describe the fill-region. While projectors exhibit enough unintentional movement (through vibration exterior shaking, etc.) to make edge-blend zones appear poor, they may move a small enough amount to not affect the fill region significantly, so that those four corner points in the projectors can continue to be used in the process. In this case the mapping from the common coordinate system to the screen (step 220), is a homography (or a homography and the optional distortion models), and the four corner points are sufficient to create that mapping.

Rather than having the user enter control points, one or more cameras could detect automatically detect fiducial marks, typically lines or points or marks or similar, which indicate how the screen should be filled. Without loss of generality, there are many way to find the mapping, step 220, from the common coordinate system to the screen.

Note that the common coordinate system in 420 can alternatively comprise the space of the screen directly. In that case, steps 210 and 220 are essentially performed concurrently. Additionally, it is noted that distortions in the screen, for example screens that are not perfectly flat have not yet been addressed herein. In a standard auto-calibration technique, the user can potentially be provided with the option to fine tune the results when the auto-calibration process is completed. That fine tuning can be defined as, and stored as, a vector field representing the non-idealities of the screen. Thus, it may be the case that either as part of step 220, or subsequent thereto, that vector field is applied. As long as the screen does not change shape over time, that derived and stored vector field will remain constant.

FIG. 4b presents a recommended part of the step 430. It is noted that in an edge-blend zone (region 105 in FIG. 1), the mismatch between the projectors should be very small to achieve a desirable projection. Sometimes even a tenth pixel deviation in the edge-blend zone can cause noticeable video degradation. However, outside the edge-blend zone, tolerances are typically much higher. The exact spot that a specific pixel lands is often not as critical, and missing by a full pixel from the ideal spot might be more than sufficient to maintain a good projection quality for most (or all) observers.

In the edge-blend zone, region 105, the models of the illustrative embodiments, using the homography and the optional projector distortion maps, typically agree very well but not perfectly. In step 450, the process measures the differences between the measured data of the overlap of the projectors and the model, in this case the homography and the optional projector distortion maps. The differences can be represented as a displacement field. The displacement can be applied in many ways. Illustratively, it can be applied using techniques borrowed from edge-blending step 460. On the left hand side of the edge-blend zone 105, the process applies all of the distortion to the right projector, 103, and none of it to the left-projector 101. This is performed so that there are no discontinuities in the left projector from outside the edge-blend zone to inside the edge-blend zone. Similarly, on the other (opposing) side of the edge-blend zone, the process applies all the distortion to the left-projector 101, and none to the right projector. In the middle, the process smoothly varies the distortion from left to right in both projectors. It is desirable to employ techniques typically used in edge-blending to smoothly vary the displacement field. For example, the process can adapt a version of the technique described in U.S. patent application Ser. No. 12/049,267, entitled SYSTEM AND METHOD FOR PROVIDING IMPROVED DISPLAY QUALITY BY DISPLAY ADJUSTMENT AND IMAGE PROCESSING USING OPTICAL FEEDBACK, whose teaching are incorporated by reference herein as useful background information. That patent describes a number of methods including an open loop method, "In a seamless multi-projector system, one must compensate for the nonlinear nature of the display output as well as vignetting effects in the projector if the intensity is to appear uniform across the blend region. Display nonlinearity is commonly modeled using a power law of the form Output intensity=(Input intensity)$^\gamma$, where a typical value for $\epsilon$ is 2.5. If one were to ignore vignetting, the inputs of two overlapping projectors could then be blended using corrected weighting functions of the form $w_1(x)=x^{1/\gamma}$ and $w_2(x)=(1-x)^{1/\gamma}$, where x varies from 0 to 1 over the blend region.

When vignetting is present, the edges of the blend region are often noticeably darker because of the intensity fall off at the edges of the projector. The open-loop method de-emphasizes a projectors light contribution near the edge by using weighting functions of the form $w_1(x)=F(x)^{1/\gamma}$ and $w_2(x)=(1-F(x))^{1/\gamma}$, where F(x) has the following minimum properties:

$F(0)=0, F(1)=1$ $F'(0)=0, F'(1)=0$

The zero first derivatives ensure that the weights near the edges are small. Two function that satisfy the criteria are (a) Hermite polynomial: $F(x)=x^2(3-2x)$ and (b) Sinusoidal: $F(x)=(1-\cos(\pi x))/2$. Other functions satisfying the overall criteria may also be used."

Often the goals are smoothness, both first and second-derivative smoothness if possible. Edge-Blending techniques are typically used for intensity reduction, a scalar, in an overlap zone of projectors where the value of the intensity is zero (0) on some sides of the overlap zone and maximum at other sides. In this case, the same techniques can be used independently for each component of the displacement field.

Note that if the camera does not image the entirety of the edge-blend zone, as can occur because of obstructions, the displacement field can be extrapolated to the regions that the camera does not image.

Once the mis-match between projected fields has been measured, and it has been decided how it is to be applied, the resulting distortion field is applied between the each projector and the common coordinate system in step 470.

With reference again to FIG. 4a, generalizing the process to more than two projectors, and possibly more than two cameras on a flat surface, the high-level steps of the process are similar to those of the above description and illustration. In step 410, the process can optionally calibrate the projectors as previously described. The process can use cameras to form pair-wise homographies between projectors (particularly, pairs of overlapping projectors). Ideally, every edge-blend zone is seen so that any distortion in the models can be captured and corrected. In 420, the process forms homographies between projectors (pairs) as described above. With many cameras, steps 450 to 470 can be applied for each camera. It is sometimes the case that the cameras disagree on the distortion calculated, in which case the process can apply camera blending algorithms, that is defining regions of the screen where the results from one camera are weighted more heavily than another. As one example of such an algorithms, the camera weights are slowly decreased (e.g. incrementally) toward the edges of the camera. Then each camera's result can be applied according to its weight in a manner very similar to edge-blending techniques.

In step 430 (as applied to a multiplicity of projectors and/or cameras), the process can define a common coordinate system in a manner similar to that of the two-projector case. Similar or the same camera blending techniques can be used, as described above with reference to step 420. It is recognized that with a multiplicity of projectors it can be desirable to define a plurality of local coordinate systems. That is, instead of establishing a single global coordinate system for the entire display field, in one space, such as the coordinates of the screen, it is contemplated that the system can define a plurality of local coordinate systems that can be mapped to the screen. For example, in the projection of an image onto a 360-degree sphere, it is often the case that local coordinates are more straightforward to use than the typically applied two global coordinate angles. Thus, as used in conjunction with step 210, a common/global coordinate system can be defined as a plurality of local coordinate systems with mappings to each other, so that the entire system is still tied together as part of a global system.

Illustratively, faceted screens, such as those used in flight simulation, for example, the WASP screen (made by Glass Mountain Optics, Austin Tex., part of FlightSafety Inc.) can be calibrated using the same processes/methods as described above. That is, jointed flat screens can be handled in a similar manner to flat screens. It should be noted that while having a camera permanently mounted can be useful, the processes discussed so far work equally well for a camera that is removed and then later replaced, and therefore not positioned in the same way each time. Similarly one or more camera(s) can be mounted on one or more pan-tilt heads. Or, a camera can be used to calibrate, removed, and later returned to a somewhat different position. More basically, a user could move to different locations with a handheld camera and acquire images of the edge-blend zones.

For curved screens, such as domes and cylinders, of known geometry, the overall process is similar or the same, although some of the specific implementation steps will vary. FIG. 5 describes the process; it is substantially similar to that of FIGS. 4a and 4b. This process initiates with step 510, and optionally calibrate the projectors as described generally above. In this case, if the process calibrates on the installation screen, then the process can use trace-rays from the screen back into the projector to find distortions in the lens model. In step 520, a non-linear minimization is established to find the extrinsic parameters of the projectors. Typically, fiducials of an appropriate pattern and size are used in this step, either chosen by control points on the projectors or by marks on the screen that the cameras can image. The non-linear minimization is implemented typically as a standard bundle adjustment algorithm. In step 530, the most-straightforward to implement common coordinate system is typically that of the screen. Thus, as described above, step 220 is merged into step 210.

In step 520, if a good estimate of lens properties of the camera is available, then this information can assist the bundle adjustment algorithm. The lens properties, if available, can be applied in a weighted manner, for example toward the center, where the lens properties of the camera can be known reasonably precisely. However toward the edge of the lens such properties are often known less precisely. Alternatively, the lens properties can be used to begin the minimization in step 520. These lens property values can be removed incrementally as the minimization continues. A distinction can be made between lens properties that are sufficiently well know to assist in the minimization process, and lens properties that are so well know that they can be used to assist mapping of pixels onto the screen.

FIG. 6 is a block diagram describing a method of color and intensity calibration of the display system. It is challenging to fully color and intensity calibrate a system with regions of the screen that are not seen by a camera. It is also challenging to measure the intensity of the screen with a camera that has large intensity fall-offs and is mounted above the screen in a manner shown generally in FIG. 1A. One mechanism to do so is for calibration process to fully calibrate the color and intensity of the system at setup, either manually or automatically or through another appropriate technique, step 610. Often an effective approach to accomplish this task is by the use of a temporary second camera. The system can then capture local information about the initial color and intensity using the mounted cameras. Then, over time, images of the screen are periodically acquired with the camera(s) for the system. These images are used by the system to determine how the intensity and color that the cameras change, step 620. Based upon the approximate assumption that the color and intensity of the projector varies as a multiplier across the entire projector, the system can then apply a uniform correction across the entire projector, step 630.

FIG. 7 is a further embodiment of the calibration system and process whose approach is substantially similar to the above-described embodiments. The display arrangement of FIG. 7 is, thus, substantially similar to the display arrangement of FIG. 1. There are depicted two projector displays, whose outlines are shown as 701 and 703, with a common overlay region of 705 (that is slightly keystoned). The outline of the screen is shown as broken line 700. The outline of the camera field of view is shown as the slightly distorted circle 707. Additionally, fiducials marked 'X' (for example) have been added. Two of these fiducials have been labeled 709 and 711. The camera is unable to image some of the fiducials, such as 709, but is able to image some of the fiducials, such as 711. Illustratively, the fiducials mark where certain pixels in the imagery displayed should land on the screen. For example, if there were a regular grid of fiducials, spaced 10% of the way across the projector screen, then it could be made that way to indicate to a calibration system that an image to be displayed across the system should be spread out such that 10% of it fell within every pair of fiducials.

Similar to the above-described embodiment(s), the projectors can be mapped to a common coordinate system, and then to the screen. In the region where the camera can image fiducials, there exists more image than in the above, fiducial-free embodiments. In this case, the fiducials essentially indicate how the system should map particular pixels to the screen. Once the calculations of step 210 are complete, the mapping from the pixels to the common coordinate system is established, and these can then be mapped from the common coordinate system to the screen, in accordance with step 220.

Given that the existing processes and methods for calculating from the common coordinate system to the screen can already produce a solution for step 220, and can arise a set of new data, which can produce a second solution; thus, the challenge is to merge the solutions to find one unified solution. In this instance, a weighting algorithm can be used. At the edge of the camera, an approach is to apply a very low weight to the camera, so that there will be no discontinuity (essentially free of any discontinuity) from inside the camera to outside the camera. At the center of the camera, the data can be weighted higher. The camera weights can be also be adjusted based on the estimated error in the location of the fiducials from the cameras; effectively providing a confidence measure.

Note that in between the fiducials, there can be an interpolation algorithm running on an appropriate processor. If it is available, an estimate of the camera to screen transform can be used to help in that interpolation, even if it is not known perfectly. Where the projectors overlap the fiducials, the interpolation can be done based on the model of the projectors.

Note that there are a variety of types of fiducials, many of which can be made invisible or not readily noticed by the human eye. Some of them can be made very miniscule. Others can be watermarked to decrease their observability by viewers. The fiducials can also respond in wavelengths that humans may not see well, but cameras do (e.g. near IR). It is sometimes desirable to vary the fiducials spatially in an appropriate manner such as varying color, reflectivity, size, shape, etc. so that the cameras can determine/distinguish which fiducial is which with respect to the overall scene.

Additional Embodiments

There are a variety of further embodiments based upon the generalized principles described herein that can be implemented in accordance with the teachings herein, combined with ordinary skill in the art.

Illustratively, the projectors can be stacked and tiled. The stacking can be implemented to enhance brightness, or it implemented to generate a stereoscopic display. As a different implementation, the individual colors of the projector can effectively treated as separate projectors to correct for lateral color distortion.

Illustratively, the system may be calibrated iteratively. The patterns projected by the projectors may be changed based on the current set of measurements, and the new images collected by the cameras can be compared to the expected image to decide if the tolerance of the correction is below a threshold.

The system, without loss of generality, may be driven to show many different kinds of content. Common examples include showing video content across the entire display whether stereo or two-dimensional pixel buffers, with part of the content shown on each projector; showing a single desktop computer across the display; and showing a flight simulator where the content is effectively cut into frusta for projectors on the screen.

The results of the calibration process can be set in a variety of processing locations, including the graphics card driver, or an injection type process, such as described in U.S. patent application Ser. No. 12/818,102, entitled SYSTEM AND METHOD FOR INJECTION OF MAPPING FUNCTIONS, the teachings of which are incorporated by reference as useful background information. Or, the results can be installed into the display system's stored optical, mechanical, thermal and electronic (OMTE) parameters.

By way of further background, the embodiments herein can be used in conjunction with the methods and processes for color and intensity correction/calibration described in U.S. patent application Ser. No. 13/523,852, entitled SYSTEM AND METHOD FOR COLOR AND INTENSITY CALIBRATING OF A DISPLAY SYSTEM FOR PRACTICAL USAGE, the teachings of which are expressly incorporated herein as useful background information. In that patent, it describes FIG. 3:

"In the geometric mapping step (310), a map is formed between the display units and the optical sensors. Many algorithms/processes can be employed to perform this illustrative process. As an example, ScatableDesktop (software produced by Scalable Display Technologies of Cambridge, Mass.) puts up a sequence of spot patterns that are collected by one or more cameras to produce such a mapping. More generally, as used herein the term "algorithm" should be taken broadly to include all or part of a process/procedure carried out using a non-transitory computer-readable medium of program instructions. The system and method herein can be implemented using such a non-transitory computer-readable medium and/or electronic hardware, including purpose-built computing chips, such as FPGAs, ASICs and the like. Additionally, where a method step or process block is shown and described, it is expressly contemplated that all or part of that step/process can be implemented in another separate, discrete step or process. Likewise, various steps/processes (or portions thereof) can be functionally combined in ways different than those depicted.

The photometric collection phase (320) can illustratively begin by capturing a background image from one or more cameras, recording the ambient illumination and projector black levels. If a background image is captured it can be used to remove ambient and black level illumination from subsequently captured images using a variety of techniques, such as various subtraction techniques. In illustrative embodiments, the data collection phase continues by sequentially illuminating each projector, one at a time with a full intensity solid white (RGB=255) input image, while sending black (RGB=0) input to all remaining projectors and capturing images from one or more cameras. These collected images, termed bright images, may be low-pass filtered to remove noise and may have each RGB pixel scaled by a 3×3 white-balance matrix. Illustratively, this white-balance matrix can be diagonal.

The next phase of the process is Target formation (step 330). Without loss of generality, there are many mechanisms of computing a target image. One method of target formation illustratively begins by accumulating the bright images for each camera or sensor into a single image termed the maximum output image. An active region, which can be determined by a mask or other methods, is selected from the maximum output image. In various embodiments, the active region can be down-sampled to a lower resolution. The active region is unrolled into an N-dimensional vector M, with one dimension for each valid pixel in the active region of the camera. In one embodiment, the quadratic optimization for optimal Target t* is solved as follows:

$$t^* = \mathrm{argmin}\ 0.5 * t^T * H * t - w1 * t$$

such that $$0 <= t \leq M$$

where $H = w2*(Dx^T*S1*Dx + Dy^T*S2*Dy) + w3*(Dxx^T*S3*Dxx + Dyy^T*S4*Dyy)$, and w1, w2, w3 are scalar weights and Dx and Dy are matrices which compute the spatial x and y first derivatives and Dxx and Dyy are matrices which compute x and y second derivatives, and $x^T$ and $y^T$ are x and y transpose. The S1, S2, S3, and S4 matrices are diagonal, and are effectively spatially varying weights that can vary based on region, and intensity, and the statistics of the histograms in the image intensity. Often, they are left as identity matrices. The constraint that the target image must be less than M effectively ensures that the target is achievable.

In a final step, the target T is computed by up-sampling t*, if necessary, to the original dimension of the maximum output image active area."

A person of skill in the art will recognize many of the advantages of pre-calibrating the projector in situ. Since the projector is calibrated in place, the parameters of the model of the projector and the non-idealities found are exactly being measured at the actual operating point, rather than relevant to all operating points of the projector. In that respect, pre-calibrating in place is akin to finding the operating point of the projector, and then generating a small perturbation model of the projector.

It is recognized that there are many types of screens whose geometry is not precisely known. There are parameterized screens such as domes whose radii are unknown. For these screens, the minimization in step 520 can include the additional screen parameters associated with such screen types.

There are also screens that are accurately described as being "extruded", which most often implies that cuts of the screen from top to bottom would form parallel straight lines. These kinds of screens can treat the perpendicular direction as a parameterized spline curve, whose parameters can be determined in step 520. A nearly flat screen, with a gentle curve, is a common extruded screen in a conference room.

There are also screens that are close to be cylinders or domes, but not exact. Sometimes, the easiest solution for these screens is to measure the screen geometry. For example, a user can direct the system to calibrate the projector system with a calibrated camera from two positions, and employ stereo methods/processes to calculate the modeled version of the screen (missing an overall scale factor).

As the description of edge-blending techniques is provided in multiple aspects of the description, it should be clear to those of skill that the types of algorithms that come up with edge-blending techniques. According to the embodiments herein, a notable point is that there is a function that has one value on one boundary or region and another distinct value on a different boundary or region. Most commonly, one of the values is zero (0), and one of the values is another maximum weight. For vector functions, it is often simplest to treat each element in the vector separately from every element of the vector. Thus, each element can be treated as a scalar. The calculated weights in between can be calculated in many ways. Those familiar with the state of the art have seen methods n the literature based on distance, squares of distance, city block distance, etc. Illustratively, the system and process can employ a calculation based on a Laplacian. For a weighting function, once the weighting is defined, there are techniques to combine the weights, including the techniques described above.

These edge-blending techniques are particularly valuable on curved surfaces, and with complicated tilings of projectors. With these setups, it is feasible to have projector overlap zones that are very complicated in shape. For these more complicated shapes, the edge-blending community has already designed methods to address these complicated shapes.

It should be clear that the above-described embodiments allow for effective calibration of a multiple display system using a short throw camera and associated wide-angle lens that performs this calibration free of an available lens model. That is, the calibration occurs in a manner that substitutes for the model and defines some information normally provided by a preexisting lens model.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments of the apparatus and method of the present invention, what has been described herein is merely illustrative of the application of the principles of the present invention. For example, as used herein, the term "automatic" shall mean, in a manner generally free of human input or intervention and acting upon data stored in and acted upon by an electronic processor. Note also, as used herein, the terms "process" and/or "processor" should be taken broadly to include a variety of electronic hardware and/or software based functions and components. Moreover, a depicted process or processor can be combined with other processes and/or processors or divided into various sub-processes or processors. Such sub-processes and/or sub-processors can be variously combined according to embodiments herein. Likewise, it is expressly contemplated that any function, process and/or processor here herein can be implemented using electronic hardware, software consisting of a non-transitory computer-readable medium of program instructions, or a combination of hardware and software. Likewise, as used herein various directional and orientation terms such as "vertical", "horizontal", "up", "down", "bottom", "top", "side", "front", "rear", "left", "right", and the like, are used only as relative conventions and not as absolute orientations with respect to a fixed coordinate system, such as gravity. Accordingly, this description is meant to be taken only by way of example, and not to otherwise limit the scope of this invention.

What is claimed is:

1. A method of calibrating a projector system having two or more projectors, with one or more cameras, comprising the steps of:
   capturing, with the one or more cameras, one or more projected patterns from the projectors in an overlap region on a screen;
   mapping projected pixels from each projector into a common coordinate system;
   mapping the common coordinate system to the screen to find a homography between the two or more projectors;
   measuring a difference between the projected pixels and a projector model generated from the homography and a projector distortion map to yield a displacement field; and
   selectively applying the displacement field outside of the overlap region.

2. The method as set forth in claim 1 wherein the projectors are pre-calibrated.

3. The method as set forth in claim 1 wherein either of the mapping steps are formed using the projector model.

4. The method as set forth in claim 1 wherein the projector distortion map includes a model of distortions from an idealized model of a projector mapping.

5. The method as set forth in claim 1 wherein the displacement field is applied between the two or more projectors and the common coordinate system using edge-blending techniques.

6. The method as set forth in claim 1 wherein mapping the common coordinate system to the screen further comprises locating fiducials on the screen using the one or more cameras.

7. The method as set forth in claim 1 further comprising storing intensity and color information and balancing intensity and color using regions of the projector system that are imaged by the one or more cameras.

8. The method as set forth in claim 1, wherein the one or more cameras image a first portion of the entire screen, thereby defining a second portion of the entire screen not imaged by the one or more cameras.

9. The method as set forth in claim 3 wherein the projector model is pre-calibrated by measurement.

10. The method as set forth in claim 3 wherein the projectors are projecting onto a flat screen.

11. The method as set forth in claim 3 wherein the projectors are projecting onto a curved screen with known or parameterized geometry.

12. The method as set forth in claim 9 wherein the pre-calibrated measurement is deduced while the projector is part of the calibrated system.

13. The method as set forth in claim 9, wherein the measurement includes measuring data from the projectors in a controlled environment.

14. A system for calibrating a projector system having two or more projectors, with one or more cameras, comprising:
   one or more cameras that capture images of one or more projected patterns from the projectors in an overlap region on a screen, and
   a processor configured to:
      map projected pixels from each projector into a common coordinate system;
      map the common coordinate system to the screen to find a homography between the two or more projectors;

measure a difference between the projected pixels and a projector model generated from the homography and a projector distortion map to yield a displacement field; and selectively apply the displacement field outside of the overlap region.

15. The system as set forth in claim 14, wherein the projectors are pre-calibrated.

16. The system as set forth in claim 14, wherein the projectors are pre-calibrated and the step of mapping to a common coordinate system includes using the projector model of the projector to surface mapping of the pre-calibrated projectors.

17. A method of calibrating a projector system having two or more projectors, with one or more cameras, comprising the steps of:

capturing, with the one or more cameras, one or more projected patterns from the projectors in an overlap region on a screen, free of requiring the one or more cameras to image the entire screen;

mapping projected pixels from each projector into a common coordinate system, the step of mapping being free of depending on a model of lens properties of the camera;

mapping the common coordinate system to the screen to find a homography between the two or more projectors, free of depending on a model of lens properties of the one or more cameras;

measuring a difference between the projected pixels and a projector model generated from the homography and a projector distortion map to yield a displacement field; and selectively applying the displacement field outside of the overlap region.

* * * * *